(12) United States Patent
Sannomiya

(10) Patent No.: US 12,214,434 B2
(45) Date of Patent: Feb. 4, 2025

(54) MACHINE TOOL AND CONTROL DEVICE FOR MACHINE TOOL

(71) Applicants: CITIZEN WATCH CO., LTD., Tokyo (JP); CITIZEN MACHINERY CO., LTD., Nagano (JP)

(72) Inventor: Kazuhiko Sannomiya, Kitasaku-gun (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 655 days.

(21) Appl. No.: 17/437,284

(22) PCT Filed: May 22, 2020

(86) PCT No.: PCT/JP2020/020409
§ 371 (c)(1),
(2) Date: Sep. 8, 2021

(87) PCT Pub. No.: WO2020/241524
PCT Pub. Date: Dec. 3, 2020

(65) Prior Publication Data
US 2022/0161339 A1    May 26, 2022

(30) Foreign Application Priority Data
May 29, 2019    (JP) .................................. 2019-099918

(51) Int. Cl.
*B23G 1/02*    (2006.01)
*B23Q 15/013*    (2006.01)
(Continued)

(52) U.S. Cl.
CPC ............. *B23G 1/02* (2013.01); *B23Q 15/013* (2013.01); *B23B 25/02* (2013.01); *B23G 1/04* (2013.01); *G05B 2219/37435* (2013.01)

(58) Field of Classification Search
CPC ........ B23G 1/02; B23G 1/04; B23G 2240/08; B23Q 15/013; B23B 25/02; B23B 1/00;
(Continued)

(56) References Cited

U.S. PATENT DOCUMENTS 5,911,802 A * 6/1999 Kimura ................... B23B 25/02
82/904
7,293,487 B2 * 11/2007 Campbell ................ B23Q 1/34
82/123
(Continued)

FOREIGN PATENT DOCUMENTS

CN    107073612 A    8/2017
EP    3 213 848 A1    9/2017
(Continued)

OTHER PUBLICATIONS

International Search Report for PCT/JP2020/020409 mailed on Jul. 28, 2020.

*Primary Examiner* — Sara Addisu
(74) *Attorney, Agent, or Firm* — Birch, Stewart, Kolasch & Birch, LLP

(57) ABSTRACT

A machine tool and a control device for the machine tool for shortening the machining time of a workpiece in a case where the relative and reciprocal vibration of workpiece holder and tool post in the radial direction of the workpiece is stopped during a period from an initial point until when the workpiece and the cutting tool come into contact with each other is provided. In the machine tool, when threading the workpiece to form a threaded portion on the workpiece by relatively moving the workpiece and the cutting tool in the feed direction while relatively rotating the workpiece and the cutting tool 130 to perform multiple times of cutting processes along the same cutting path in a predetermined spiral form, the cutting tool is brought closer toward the workpiece in the feed direction from a predetermined initial (Continued)

point at which the workpiece and the cutting tool are separated from each other, the workpiece and the cutting tool come into contact with each other, and the threading is started with the contact. During the period from the initial point until when the workpiece and the cutting tool come into contact with each other, a controller stops the vibration of the cutting tool, and, in continuous cutting processes in the multiple times of cutting processes in the threading, the control means sets a phase position of the tool post in the vibration direction and stops the reciprocal vibration so that, when the workpiece and the cutting tool come into contact with each other, each of the continuous cutting processes has a predetermined phase in the reciprocal vibration relative to a rotation phase of the workpiece at the start of the threading.

2 Claims, 7 Drawing Sheets

(51) Int. Cl.
*G05B 19/4093* (2006.01)
*B23B 25/02* (2006.01)
*B23G 1/04* (2006.01)

(58) Field of Classification Search
CPC ...... G05B 19/4093; G05B 2219/37435; G05B 19/404; G05B 19/186; G05B 19/416
See application file for complete search history.

(56) References Cited

U.S. PATENT DOCUMENTS

| | | | |
|---|---|---|---|
| 2017/0102685 A1* | 4/2017 | Kitakaze | B23B 25/02 |
| 2017/0108846 A1* | 4/2017 | Sannomiya | B23Q 17/12 |
| 2017/0304920 A1* | 10/2017 | Sannomiya | G05B 19/4093 |
| 2017/0322538 A1* | 11/2017 | Watanabe | G05B 19/4093 |
| 2018/0281090 A1* | 10/2018 | Watanabe | B23G 1/02 |
| 2020/0282502 A1* | 9/2020 | Nakaya | B23B 1/00 |
| 2021/0370455 A1* | 12/2021 | Sannomiya | B23B 1/00 |
| 2022/0269241 A1* | 8/2022 | Sagasaki | G05B 19/4163 |
| 2023/0050486 A1* | 2/2023 | Sannomiya | G05B 19/4093 |

FOREIGN PATENT DOCUMENTS

| | | | | |
|---|---|---|---|---|
| JP | 10-43906 A | | 2/1998 | |
| JP | 2020192647 A | * | 12/2020 | ............... B23B 1/00 |
| JP | 2021092936 A | * | 6/2021 | ............... B23B 1/00 |
| WO | WO 2016/056526 A1 | | 4/2016 | |
| WO | WO 2016/067372 A1 | | 5/2016 | |

* cited by examiner

MACHINE TOOL AND CONTROL DEVICE FOR MACHINE TOOL

TECHNICAL FIELD

The present invention relates to a machine tool for threading a workpiece and a control device for the machine tool.

BACKGROUND ART

A conventional machine tool for threading a workpiece is known that includes workpiece holding means for holding the workpiece, a tool post to hold a cutting tool for cutting the workpiece, feeding means for feeding the cutting tool to the workpiece in a predetermined feed direction by relatively moving the workpiece holding means and the tool post, vibration means for relatively reciprocating the workpiece holding means and the tool post in a radial direction of the workpiece, and rotating means for relatively rotating the workpiece and the cutting tool, and that threads the workpiece to form a threaded portion on the workpiece by relatively moving the workpiece and the cutting tool in the feed direction while relatively rotating the workpiece and the cutting tool to perform multiple times of cutting processes along the same cutting path in a predetermined spiral form (see, for example, patent literature 1).

In patent literature 2, a turning device, in which the vibration of the cutting tool is stopped until the cutting tool comes into contact with the workpiece, is disclosed.

CITATION LIST

Patent Literature

[Patent Literature 1] WO 2016/056526
[Patent Literature 2] JP10-43906 A

SUMMARY OF INVENTION

Technical Problem

In a case where, while relatively rotating the workpiece and the cutting tool, the workpiece holding means and the tool post are relatively and reciprocally vibrated in the radial direction of the workpiece and relatively fed along the feed direction to thread the workpiece, if the cutting tool is brought closer to the workpiece in the feed direction from a predetermined initial point at which the workpiece and the cutting tool are separated from each other and the threading is started with the contact of the workpiece and the cutting tool, it is conceivable that, during a period from the initial point until when the workpiece and the cutting tool come into contact with each other, the reciprocal vibration is stopped so as not to generate unnecessary vibration since there is no contact between the cutting tool and the workpiece.

However, in the continuous cutting processes in the multiple times of cutting processes of the threading, due to the stop of the reciprocal vibration, it is necessary to set the rotation phase of the workpiece and the vibration phase of the cutting tool in a predetermined relationship. Therefore, the time required to machine the work sometimes becomes long.

The present invention was made in view of the above circumstance, and it is an object of the present invention to provide a machine tool and a control device for the machine tool for shortening the machining time of the workpiece in a case where the relative and reciprocal vibration of the workpiece holding means and the tool post in the radial direction of the workpiece is stopped during the period from the initial point until when the workpiece and the cutting tool come into contact with each other.

Solution to Problem

Firstly, the present invention is characterized by a machine tool comprising: workpiece holding means for holding a workpiece; a tool post to hold a cutting tool for cutting the workpiece; feeding means for feeding the cutting tool in a predetermined feed direction toward a workpiece via relative movement of the workpiece holding means and the tool post; vibration means for relatively and reciprocally vibrating the workpiece holding means and the tool post in a radial direction of the workpiece; rotating means for relatively rotating the workpiece and the cutting tool; and control means for controlling operations of the feeding means, the vibration means and the rotating means, and when threading the workpiece to form a threaded portion on the workpiece by relatively moving the workpiece and the cutting tool in the feed direction while relatively rotating the workpiece and the cutting tool to perform multiple times of cutting processes along the same cutting path in a predetermined spiral form, the cutting tool being brought closer toward the workpiece in the feed direction from a predetermined initial point at which the workpiece and the cutting tool are separated from each other, the workpiece and the cutting tool coming into contact with each other, and the threading being started with the contact, wherein, during a period from the initial point until when the workpiece and the cutting tool come into contact with each other, the control means controls the vibration means to stop the reciprocal vibration, and, in continuous cutting processes in the multiple times of cutting processes in the threading, the control means sets a phase position of the tool post in the vibration direction and stops the reciprocal vibration so that, when the workpiece and the cutting tool come into contact with each other, each of the continuous cutting processes has a predetermined phase in the reciprocal vibration relative to a rotation phase of the relative rotation at the start of the threading.

Secondly, the present invention is characterized by a control device for a machine tool provided in a machine tool that includes: workpiece holding means for holding a workpiece; a tool post to hold a cutting tool for cutting the workpiece; feeding means for feeding the cutting tool in a predetermined feed direction toward a workpiece via relative movement of the workpiece holding means and the tool post; vibration means for relatively and reciprocally vibrating the workpiece holding means and the tool post in a radial direction of the workpiece; rotating means for relatively rotating the workpiece and the cutting tool; and control means for controlling operations of the feeding means, the vibration means and the rotating means, and when threading the workpiece to form a threaded portion on the workpiece by relatively moving the workpiece and the cutting tool in the feed direction while relatively rotating the workpiece and the cutting tool to perform multiple times of cutting processes along the same cutting path in a predetermined spiral form, the cutting tool being brought closer toward the workpiece in the feed direction from a predetermined initial point at which the workpiece and the cutting tool are separated from each other, the workpiece and the cutting tool coming into contact with each other, and the threading being started with the contact, wherein, during a period from the initial point until when the workpiece and the cutting tool come into contact with each other, the control device stops the reciprocal vibration, and, in continuous cutting processes in the multiple times of cutting processes in the threading, the control device sets a phase position of the tool post in the vibration direction and stops the reciprocal vibration so that, when the workpiece and the cutting tool come into contact with each other, each of the continuous cutting processes has a predetermined phase in the reciprocal vibration relative to a rotation phase of the relative rotation at the start of the threading.

Advantageous Effect of Invention

According to the present invention, the following effect can be obtained. During the period from the initial point until when the workpiece and the cutting tool come into contact with each other, the reciprocal vibration is stopped in a state where the rotation phase of the workpiece and the vibration phase of the cutting tool are set in a predetermined relationship that is necessary at the time of contact of the workpiece and the cutting tool. Thus, unnecessary vibration can be avoided during the period from the initial point until when the workpiece and the cutting tool come into contact with each other, and cutting of the workpiece with vibration can be started with the contact. Therefore, in a case where the relative and reciprocal vibration of the workpiece holding means and the tool post in the radial direction of the workpiece is stopped, the machining time of the workpiece can be shortened.

DESCRIPTION OF EMBODIMENTS

First Embodiment

Figure 1:
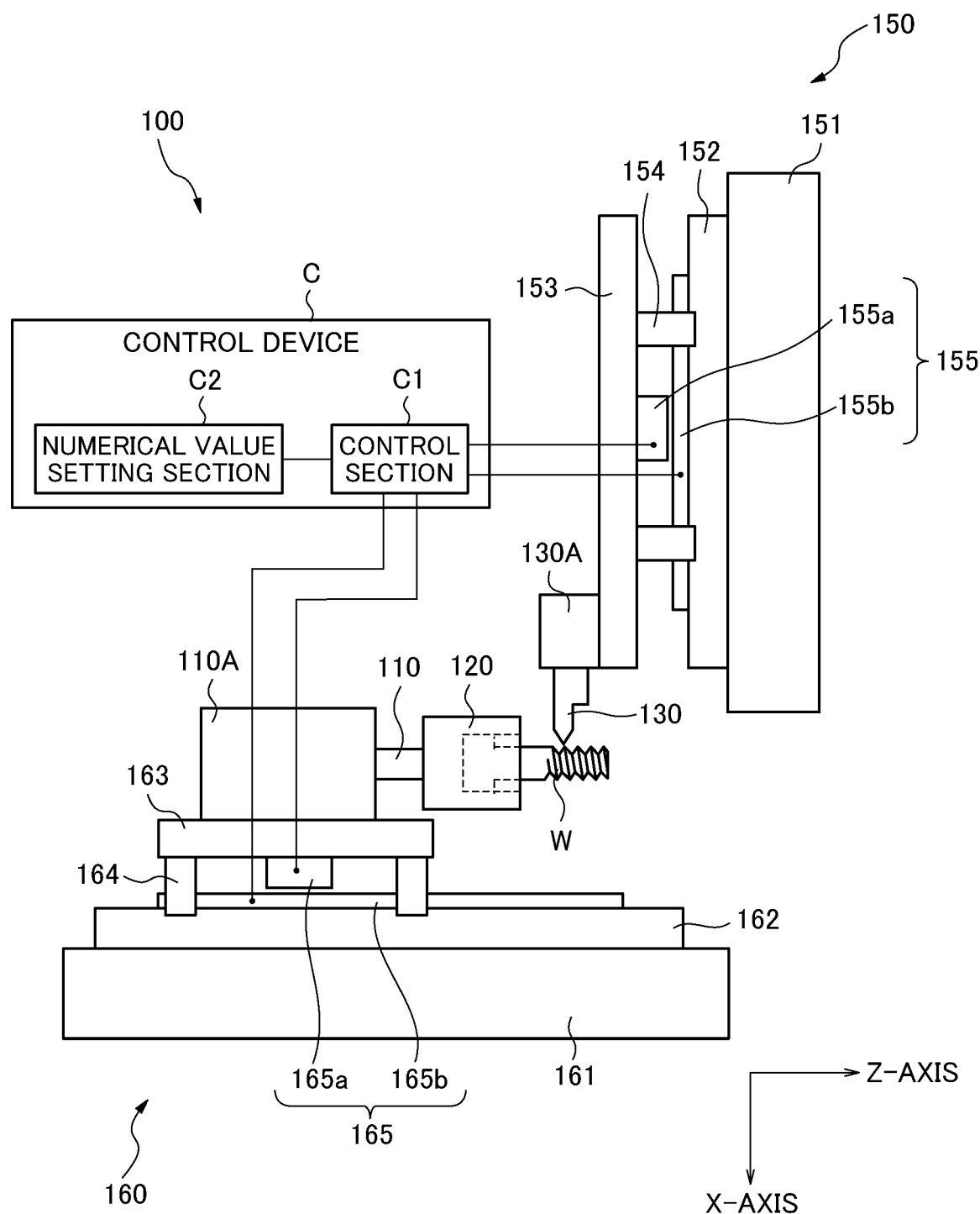
FIG. 1 is a diagram schematically illustrating a machine tool of a first embodiment of the present invention.

FIG. 1 is a diagram schematically illustrating a machine tool 100 including a control device C of a first embodiment of the present invention.

The machine tool 100 includes a spindle 110 and a cutting tool post 130A.

A chuck 120 is provided at a front end of the spindle 110.

A workpiece W is held by the spindle 110 via the chuck 120, and the spindle 110 is configured as workpiece holding means for holding a workpiece.

The spindle 110 is supported by a spindle headstock 110A so as to be rotatably driven by a spindle motor that is not illustrated.

As the spindle motor in the spindle headstock 110A, a conventionally known built-in motor formed between the spindle headstock 110A and the spindle 110 is conceivable, for example.

The spindle headstock 110A is mounted on a side of a bed of the machine tool 100 so as to be movable in a Z-axis direction, which is an axial direction of the spindle 110, by a Z-axis direction feeding mechanism 160.

The spindle 110 is moved in the Z-axis direction by the Z-axis direction feeding mechanism 160 via the spindle headstock 110A.

The Z-axis direction feeding mechanism 160 constitutes a spindle moving mechanism to move the spindle 110 in the Z-axis direction.

The Z-axis direction feeding mechanism 160 includes a base 161, which is integrated with a stationary side of the Z-axis direction feeding mechanism 160 including the bed, and a Z-axis direction guide rail 162 provided on the base 161 and extending in the Z-axis direction.

The Z-axis direction guide rail 162 slidably supports a Z-axis direction feeding table 163 via a Z-axis direction guide 164.

A mover 165a of a linear servo motor 165 is provided on a side of the Z-axis direction feeding table 163, and a stator 165b of the linear servo motor 165 is provided on a side of the base 161.

The spindle headstock 110A is mounted on the Z-axis direction feeding table 163, and the Z-axis direction feeding table 163 is moved by the linear servo motor 165 in the Z-axis direction.

Due to the movement of the Z-axis direction feeding table 163, the spindle headstock 110A moves in the Z-axis direction, enabling movement of the spindle 110 in the Z-axis direction.

A cutting tool 130 such as a tool bit for cutting the workpiece W is attached to the cutting tool post 130A.

The cutting tool post 130A constitutes a tool post that holds a cutting tool 130. The cutting tool post 130A is provided on the side of the bed of the machine tool 100 so as to be movable in an X-axis direction, which is orthogonal to the Z-axis direction, and a Y-direction, which is orthogonal to the Z-axis direction and the X-axis direction, by virtue of an X-axis direction feeding mechanism 150 and a Y-axis direction feeding mechanism that is not illustrated.

The X-axis direction feeding mechanism 150 and the Y-axis direction feeding mechanism constitute a tool post moving mechanism to move the cutting tool post 130A in the X-axis direction and the Y-axis direction toward the spindle 110.

The X-axis direction feeding mechanism 150 includes a base 151, which is integrated with a stationary side of the X-axis direction feeding mechanism 150, and an X-axis direction guide rail 152 provided on the base 151 and extending in the X-axis direction.

The X-axis direction guide rail 152 slidably supports an X-axis direction feeding table 153 via an X-axis direction guide 154.

A mover 155a of a linear servo motor 155 is provided on a side of the X-axis direction feeding table 153, and a stator 155b of the linear servo motor 155 is provided on a side of the base 151.

The X-axis direction feeding table 153 is moved by the linear servo motor 155 in the X-axis direction.

The Y-axis direction feeding mechanism has the same configuration as the X-axis direction feeding mechanism 150 except being arranged in the Y-axis direction, and is thus not illustrated and described herein in detail.

In FIG. 1, the X-axis direction feeding mechanism 150 is mounted on the side of the bed via the Y-axis direction feeding mechanism that is not illustrated, and the cutting tool post 130A is mounted on the X-axis direction feeding table 153.

The cutting tool post 130A is moved in the X-axis direction by the X-axis direction feeding table 153 and is moved in the Y-axis direction by the Y-axis direction feeding mechanism, which operates in the Y-axis direction in a similar manner to the X-axis direction feeding mechanism 150.

Alternatively, the Y-axis direction feeding mechanism not illustrated herein may be mounted on the side of the bed via the X-axis direction feeding mechanism 150, and the cutting tool post 130A may be mounted on a side of the Y-axis direction feeding mechanism. The configuration for moving the cutting tool post 130A in the X-axis direction and the Y-axis direction via the X-axis direction feeding mechanism 150 and the Y-axis direction feeding mechanism is conventionally known and is thus not described and illustrated herein in detail.

The tool post moving mechanism (the X-axis direction feeding mechanism 150 and the Y-axis direction feeding mechanism) and the spindle moving mechanism (the Z-axis direction feeding mechanism 160) cooperate to feed the cutting tool 130 attached to the cutting tool post 130A in any feed direction with respect to the workpiece W via movement of the cutting tool post 130A in the X-axis direction and the Y-axis direction by the X-axis direction feeding mechanism 150 and the Y-axis direction feeding mechanism and via movement of the spindle headstock 110A (the spindle 110) in the Z-axis direction by the Z-axis direction feeding mechanism 160.

Figure 2:
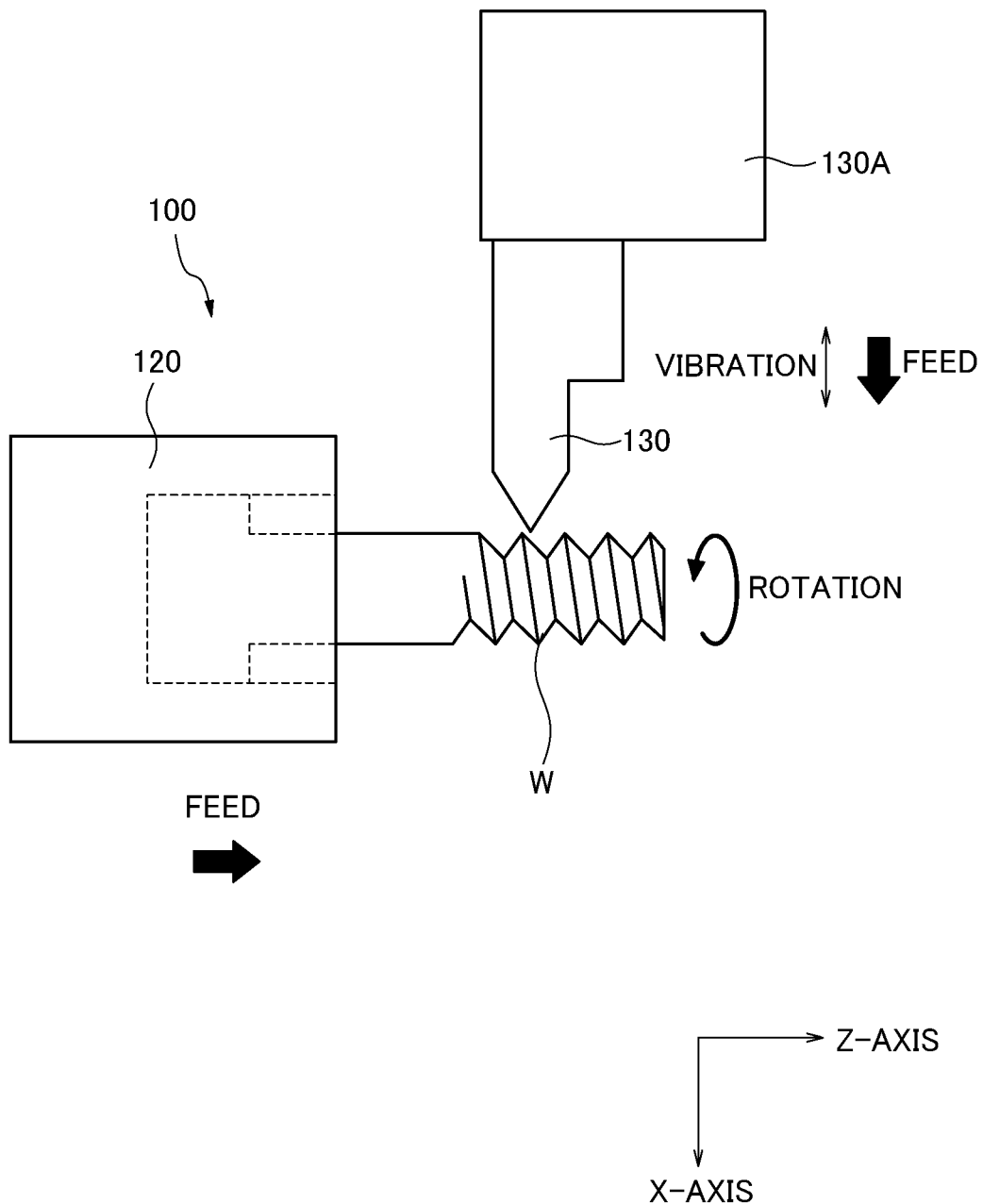
FIG. 2 is a diagram schematically illustrating the relation between a cutting tool and a workpiece in the first embodiment.

By relatively feeding the cutting tool 130 with respect to the workpiece W in the arbitrary feed direction with the feeding means including the spindle moving mechanism (the Z-axis direction feeding mechanism 160) and the tool post moving mechanism (the X-axis direction feeding mechanism 150 and the Y-axis direction feeding mechanism) and by relatively and reciprocally vibrating the cutting tool 130 with respect to the workpiece W in the radial direction of the workpiece W that intersects with the feed direction with the vibration means including the spindle moving mechanism and the tool post moving mechanism, multiple times of cutting processes in a spiral form are performed to form a threaded portion on the workpiece with the cutting tool 130 as shown in FIG. 2.

In the present embodiment, both the spindle headstock 110A and the cutting tool post 130A are configured as movable. Alternatively, the spindle headstock 110A may be immovably fixed on the side of the bed of the machine tool 100, and the tool post moving mechanism may be configured to move the cutting tool post 130A in the X-axis direction, the Y-axis direction, and the Z-axis direction.

In this case, the feeding means and the vibration means includes a tool post moving mechanism that moves the cutting tool post 130A in the X-axis direction, the Y-axis direction, and the Z-axis direction. By moving the cutting tool post 130A with respect to the spindle 110 rotated at a fixed position, the cutting tool 130 can be fed to the workpiece W and reciprocally vibrated.

Alternatively, the cutting tool post 130A may be immovably fixed on the side of the bed of the machine tool 100, and the spindle moving mechanism may be configured to move the spindle headstock 110A in the X-axis direction, the Y-axis direction, and the Z-axis direction.

In this case, the feeding means and the vibration means includes a spindle headstock moving mechanism that moves the spindle headstock 110A in the X-axis direction, the Y-axis direction, and the Z-axis direction. By moving the spindle headstock 110A with respect to the cutting tool post 130A located at a fixed position, the cutting tool 130 can be fed to the workpiece W and reciprocally vibrated.

Although in the present embodiment the X-axis direction feeding mechanism 150, the Y-axis direction feeding mechanism, and the Z-axis direction feeding mechanism 160 are configured to be moved by a linear servo motor, they may be moved by a conventional ball screw and a servo motor.

In the present embodiment, the spindle motor such as the built-in motor constitutes rotating means for relatively rotating the workpiece W and the cutting tool 130, and the relative rotation of the workpiece W and the cutting tool 130 is achieved by rotation of the spindle 110.

In the present embodiment, the workpiece W is rotated with respect to the cutting tool 130. Alternatively, the cutting tool 130 may be rotated with respect to the workpiece W.

The spindle 110, the Z-axis direction feeding mechanism 160, the X-axis direction feeding mechanism 150, and the Y-axis direction feeding mechanism are driven and controlled by a control section C1 of the control device C.

The control section C1 is preliminarily set up to execute the control so that the spindle headstock 110A or the cutting tool post 130A is moved in each moving direction while reciprocally vibrating along the each moving direction by utilizing ea ch feeding mechanism as vibration means.

As shown in FIGS. 3 to 6, each feeding mechanism is controlled by the control section C1 to thread the workpiece in a spiral form, for example, with seven times of cutting processes.

Here, the number of cutting processes is how many cutting processes constitutes the threading.

Figure 3:
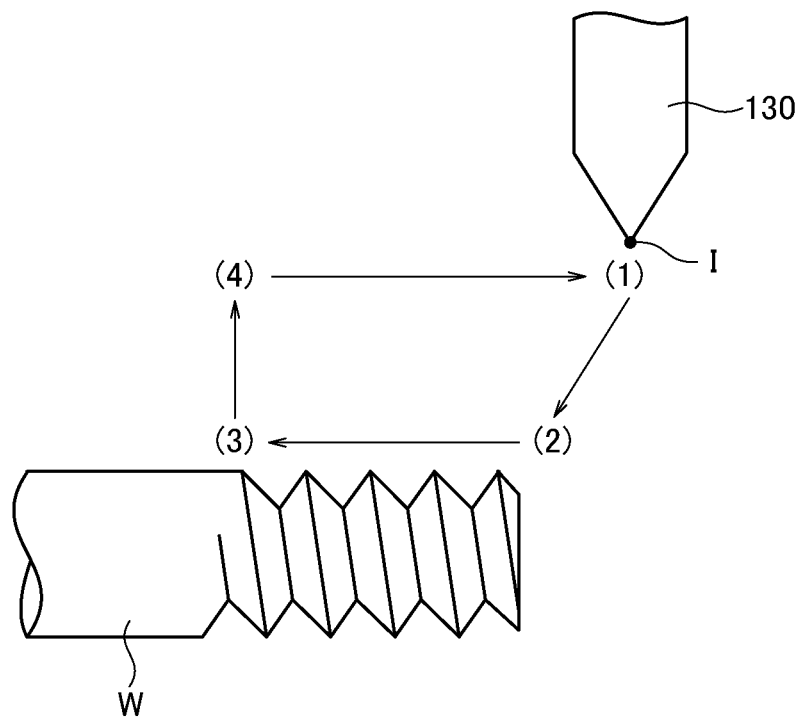
FIG. 3 is a diagram illustrating a cycle of the threading in the first embodiment.

The control section C1 controls each feeding mechanism to move the cutting tool 130 with respect to the workpiece W as shown by the arrows shown in FIG. 3 to form a male screw on the outer peripheral surface of the workpiece W (cycles (1) to (4)). In the cycle (1), the cutting edge of the cutting tool 130 is located at the initial point I. The initial point I is a point for positioning fast-forward movement at which the workpiece W and the cutting edge of the cutting tool 130 are separated from each other. With the feed in the threading (also referred to as an approach operation), the cutting tool 130 moves from the initial point I toward the machining start point (shown by S1 in FIG. 4(A)). The machining start point is the start point of the threading, and is set at a position away from the end face of the workpiece W by a predetermined times of the screw pitch (or lead) in the Z direction. During this approach operation, the vibration of the cutting tool 130 is stopped. In the above explanation, although the approach operation of the cutting tool 130 toward the workpiece W is described as a movement from diagonally above the end face of the workpiece W, the cutting tool 130 may move vertically downward and then may move horizontally toward the end face of the workpiece W.

Next, in the cycle (2), the cutting tool 130 starts vibration at the machining start point S1, and the workpiece W moves toward the cutting tool 130 with rotating, so that the workpiece W and the cutting edge of the cutting tool 130 come into contact with each other. A thread groove (first time) is actually cut into the workpiece W from the contact position.

Figure 4:
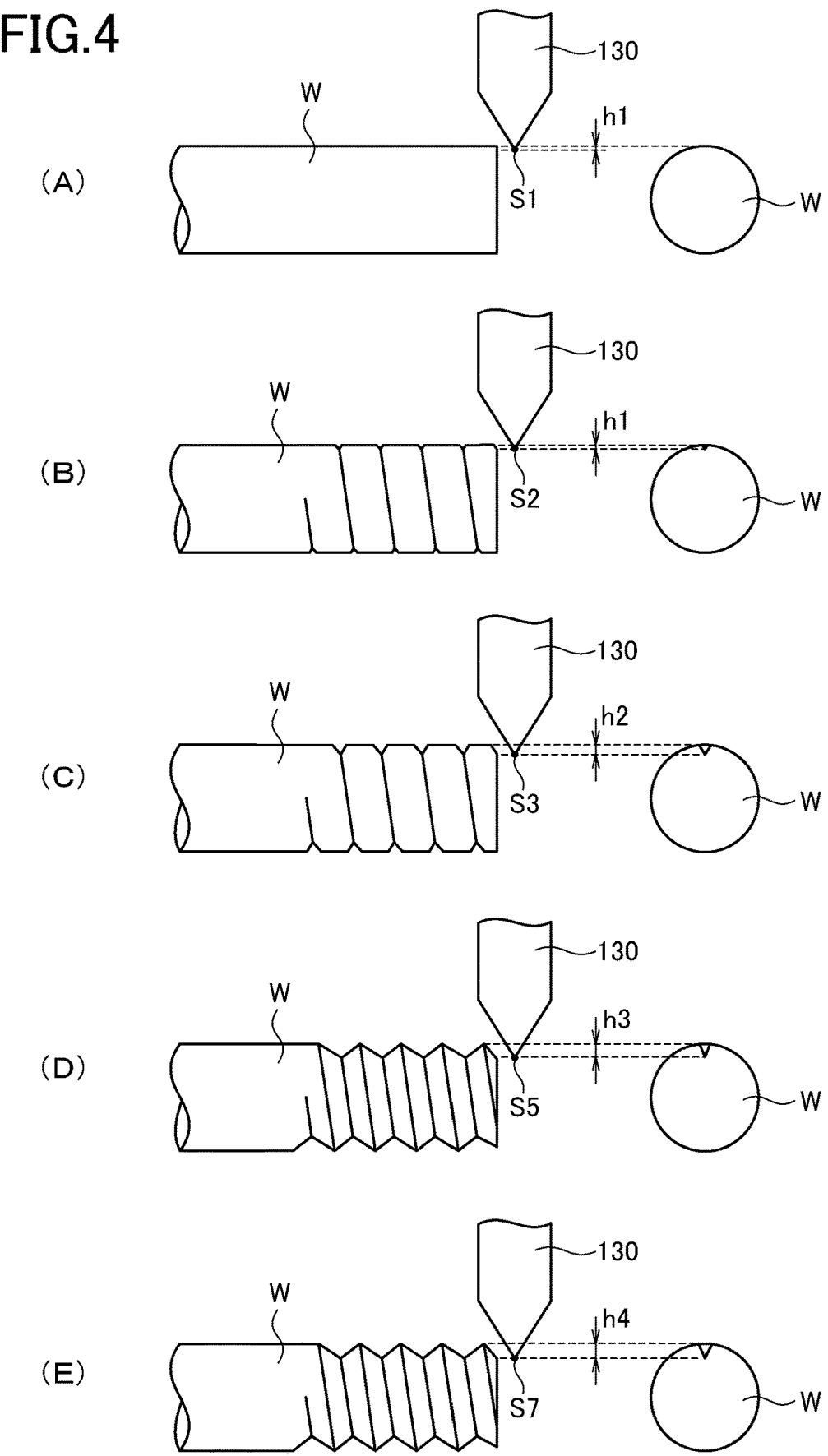
FIG. 4 is a diagram illustrating vibration phases (machining start points) of the threading in the first embodiment.

In the cycle (3), when the cutting tool 130 moves to the machining end point of the thread groove, the cutting tool 130, for example, stops vibration and moves toward an evacuation point set above the workpiece W. After that, in the cycle (4), when the cutting tool 130 moves in fast-forward movement so as to move away from the workpiece W, the cutting tool 130 moves from this evacuation point toward the initial point I in a state where, for example, the vibration is stopped. When the cutting tool 130 reaches the initial point I, the first cutting process is completed, and the second cutting process is started. After that, the above cycles (1) to (4) are repeated, and the machining start points are changed to S1 (S2), S3, S5, and S7 as shown in FIG. 4 to perform seven times of cutting in total.

In the present embodiment, since multiple times of cutting processes are performed along the same cutting path in a spiral form, the rotation phases of the workpiece W at the start of the threading (the angular position seen in the circumferential direction of the workpiece W at which threading is started) are the same in all seven cutting processes.

Further, in the present embodiment, in the first cutting process, the cutting tool 130 is reciprocated so that the cutting process is started from the start position of the backward movement of the reciprocal vibration and, in the backward movement of the reciprocating vibration of the cutting tool 130, the tip of the cutting tool 130 reaches the outer peripheral surface of the workpiece W. Therefore, as shown in FIG. 4(A), the machining start point S1 is set at a position at a distance h1 away from the outer peripheral surface of the workpiece W, seen in the radial direction of the workpiece W, before the threading.

In the second cutting process, the cutting tool 130 is reciprocated so that the cutting process is started from the start position of the backward movement in the first cutting process and, the tip of the cutting tool 130 in the backward movement of the second cutting process reaches the position of the path of the cutting tool 130 in the first cutting process. In this case, the machining start point S2 is set at a position at a distance h1 away from the outer peripheral surface of the workpiece W before the threading. Therefore, as shown in FIG. 4 (B), the machining start point S2 is at the same position as the machining start point S1 in FIG. 4 (A).

In the third cutting process, the cutting tool 130 is reciprocated so that the cutting process is started from the start position of the backward movement in the reciprocal movement and, in the backward movement of the reciprocal vibration of the cutting tool 130, the tip of the cutting tool 130 reaches the position of the path of the cutting tool 130 in the second cutting process. Therefore, as shown in FIG. 4(C), the machining start point S3 is set at a position at a distance h2 (>h1) away from the outer peripheral surface of the workpiece W before the threading.

In the fourth cutting process, the cutting tool 130 is reciprocated so that the cutting process is started from the start position of the backward movement in the third cutting process and, the tip of the cutting tool 130 in the backward movement in the fourth cutting process reaches the position of the path of the cutting tool 130 in the third cutting process. In this case, the machining start point is set at a position at a distance h2 away from the outer peripheral surface of the workpiece W before the threading. Therefore, the machining start point is at the same position as the machining start point S3 in FIG. 4(C).

In the fifth cutting process, the cutting tool 130 is reciprocated so that the cutting process is started from the start position of the backward movement in the reciprocal vibration, and in the backward movement of the reciprocal vibration of the cutting tool 130, the tip of the cutting tool 130 reaches the position of the path of the cutting tool 130 in the fourth cutting process. Therefore, as shown in FIG. 4(D), the machining start point S5 is set at a position at a distance h3 (>h2) away from the outer peripheral surface of the workpiece W before the threading.

In the sixth cutting process, the cutting tool 130 is reciprocated so that the cutting process is started from the start position of backward movement in the fifth cutting process, and the tip of the cutting tool 130 in the backward movement of the sixth cutting process reaches the position of the path of the cutting tool 130 in the fifth cutting process. In this case, the machining start point is set at a position at a distance h3 away from the outer peripheral surface of the workpiece W before the threading. Therefore, the machining start point is at the same position as the machining start point S5 in FIG. 4 (D).

In the final seventh cutting process, the cutting tool 130 is not vibrated. As shown in FIG. 4(E), the machining start point S7 is set at a position at a distance h4 (>h3) away from the outer peripheral surface of the workpiece W before the threading.

In the approach operation, the control section C1 sets the phase position of the cutting tool 130 in the vibration direction so that the cutting tool 130 is in the vibration phase of the machining start point for the next cutting process, and then, sets the cutting tool 130 to a stop state in reciprocating vibration. For example, in the first cutting process, the rotation phase of the workpiece W and the vibration phase of the cutting tool 130 (machining start point S1 in FIG. 4(A)) can be synchronized at the initial point I or during the approach operation, and the cutting tool base 130A can be stopped. After that, when starting each cutting process, the rotation phase of the workpiece W and the vibration phase of the cutting tool 130 (at machining start points S2 in FIG. 4(B), machining start points S3 in FIG. 4(C), machining start points S5 in FIG. 4(D) and machining start points S7 in FIG. 4(E)) can be synchronized at the initial point I or during the approach operation, and the cutting tool base 130A can be stopped. When the cutting tool 130 complete moving to the machining end point of the thread groove, the cutting tool 130 can be stopped at a phase position in the vibration direction required at the initial point I of the cutting tool 130. Further, when the cutting tool 130 is moved from the machining end point of the thread groove toward the evacuation point, it can be moved at the feed speed of the threading or moved at the speed of the fast-forward movement.

In this way, during the period from the initial point I until when the workpiece W and the cutting tool 130 come into contact with each other, the rotation phase of the workpiece W and the vibration phase of the cutting tool 130 are set in a predetermined relationship required for the contact of the workpiece W and the cutting tool 130, and the reciprocating vibration is stopped. Therefore, unnecessary vibration during the period from the initial point I until when the workpiece W and the cutting tool 130 come into the contact with each other can be avoided. Moreover, at time when the cutting tool 130 and the workpiece W come into contact with each other, cutting with vibration can be started. Therefore, even in a case where the relative and reciprocal vibration of the workpiece W in the radial direction by the spindle 110 and the cutting tool post 130A is stopped, the machining time of the workpiece W can be shortened.

Figure 5:
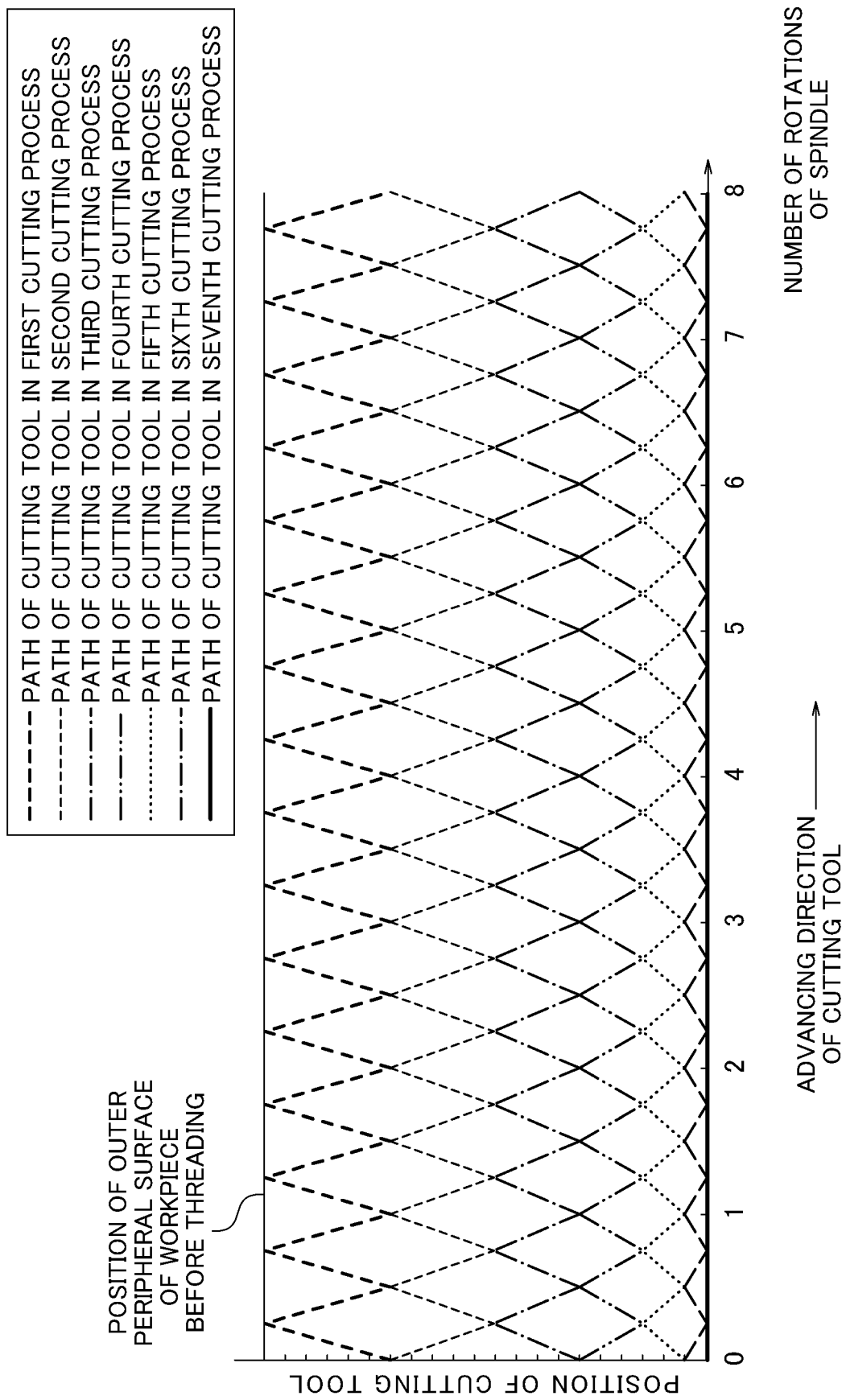
FIG. 5 is a development diagram schematically illustrating positions of the cutting tool with respect to the workpiece in the first embodiment of the present invention.

FIG. 5 is a development diagram schematically illustrating positions of the cutting tool with respect to the workpiece according to the first embodiment of the present invention.

In FIG. 5, the vibration of the cutting tool 130 is represented as a straight line for easy understanding.

The control section C1 functions as control means for making the path of the cutting tool in the backward movement of the continuous n+1th (n is an integer of 1 or more) cutting process reach the position of the path of the cutting tool in the nth cutting process.

Further, the control section C1 also functions as vibration setting means for setting a vibration pattern during each cutting process with reciprocal vibration by changing the vibration pattern that is, for example, the phases of the vibrations at the time of cutting in the continuous nth and n+1th cutting process so that the cutting part in the nth cutting processes is partially included in the cutting part in the n+1 the cutting process.

In the first to sixth cutting processes, the frequency of the vibration means is fixed, and the cutting tool 130 vibrates, for example, twice in the X-axis direction for one rotation of the workpiece.

In the present embodiment, in the first cutting process, the cutting tool 130 is reciprocally vibrated so that the cutting process is started from the start of the backward movement of the reciprocal vibration, and the tip of the cutting tool 130 reaches the outer peripheral surface of the workpiece W in the backward movement of the reciprocal vibration of the cutting tool 130.

Chips are divided at a portion where the tip of the cutting tool 130 reaches the outer peripheral surface of the workpiece W.

In the second cutting process, the control section C1 changes the phase of the second cutting process with respect to the phase of the first cutting process, and makes the path of the cutting tool 130 in the backward movement of the second cutting process reach the position of the path of the cutting tool 130 in the first cutting process.

In the present embodiment, particularly, the phase of the reciprocal vibration in the second (n+1th n is an integer of 1 or more) cutting process is set to be opposite to the phase of the reciprocal vibration in the first (nth) cutting process so that the second cutting process is started from the start of the forward movement of the reciprocal vibration and the path of the cutting tool 130 in the backward movement of the second cutting process reaches the position of the path of the cutting tool 130 at the time of switching from the forward movement to the backward movement in the first cutting process.

Chips are divided at the time when the cutting tool reaches the position. In other words, under the control of the control section C1, the cutting part in the backward movement of the second cutting process and the cutting part in the forward movement of the first cutting process come into contact with each other.

If there is contact of the cutting part in the forward movement of the first cutting process and the cutting part in the backward movement of the second cutting process, the cutting part in the backward movement of the second cutting process is partially included in the cutting part in the forward movement of the first cutting process as a "point" theoretically. In this point, the cutting tool 130 does not cut the workpiece W at all and the air-cut occurs. Since the air-cut occurs at a "point", chips generated from the workpiece W during the cutting process are sequentially divided by the air-cut (at a contact point of the cutting part in the forward movement of the first cutting process and the cutting part in the backward movement of the second cutting process).

The third to sixth cutting processes are executed in the same relationship as the relationship between the first cutting process and the second cutting process.

If the amplitude of the reciprocal vibration corresponds to the cutting amount in the cutting process, the cutting parts in the two consecutive cuttings processes come into contact with each other.

Since the cutting amount of the cutting process is reduced in one threading, the amplitude of the reciprocal vibration is controlled so as to decrease as the number of cutting processes increases.

As a result, the unevenness of the bottom surface of the screw of the workpiece W gradually becomes finer as the number of cutting processes increases.

In the final seventh cutting process, the flatness of the bottom surface of the screw of the workpiece W can be improved by cutting the bottom surface of the screw of the workpiece W without vibrating the cutting tool 130.

Figure 6:
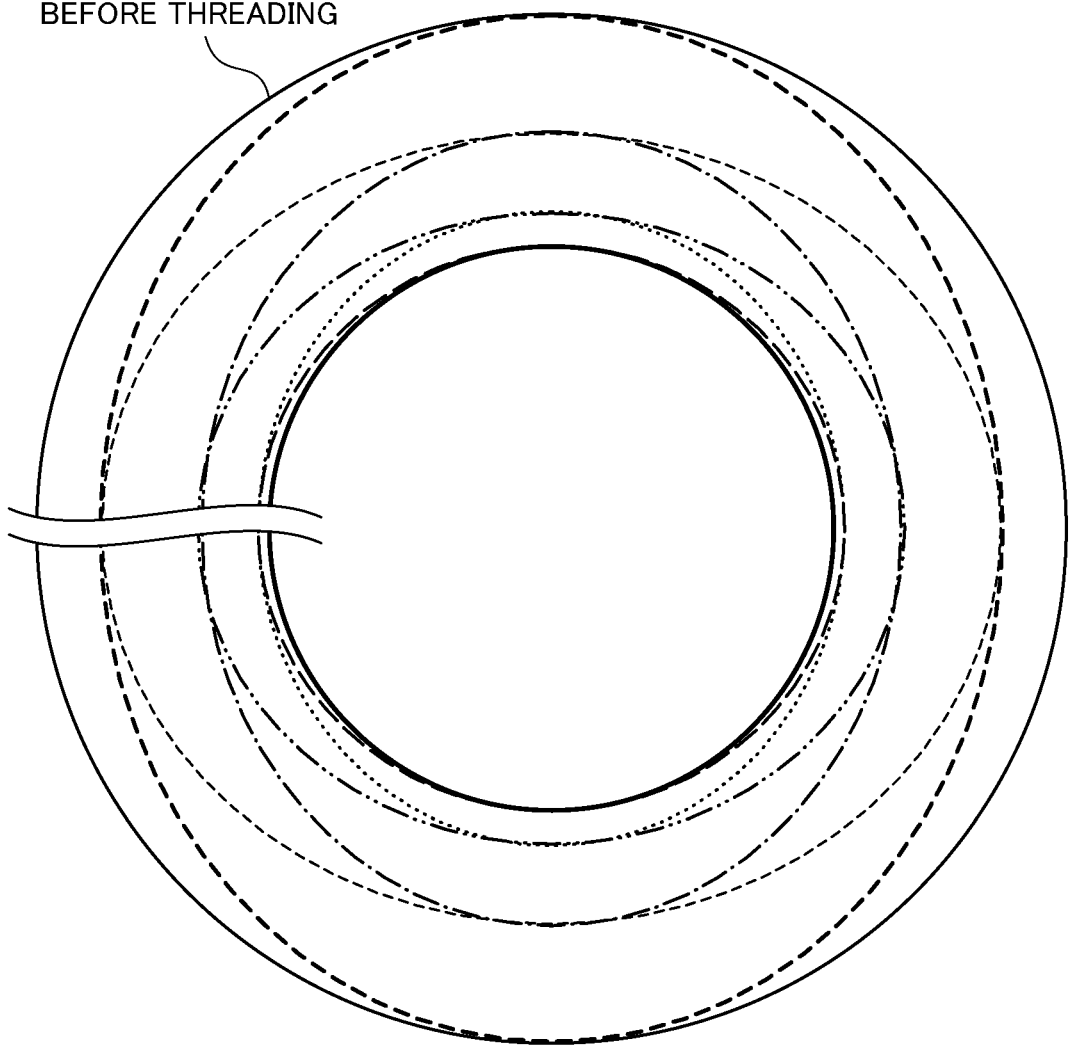
FIG. 6 is a conceptual diagram illustrating paths, seen from the Z-axis direction, in a thread groove of the workpiece by the cutting tool.

A conceptual diagram in which paths of the cutting tool 130 in a thread groove in FIG. 5 are seen from the Z-axis direction of the workpiece W is shown in FIG. 6.

In the cutting condition of FIG. 5, the frequency of the cutting tool 130 per one rotation of the spindle is twice. Therefore, as shown in FIG. 6, seen from the Z-axis direction, the workpiece W has an elliptical shape, and two air-cut occurs in the circumference length of the workpiece W (for one rotation of the workpiece).

Then, as the cutting process is continued two, three times or more, the area remaining in the major axis direction, which has an elliptical shape by the previous cutting process, is cut in the next cutting process with the decreased amplitude. In this way, as the formation of the thread groove progresses, the flatness of the machined surface is improved.

In the machine tool 100 of the present embodiment, the number of rotations of the spindle 110, the frequency of the cutting tool 130 per rotation of the spindle, and the like are configured to be set by the user in the control section C1 via the numerical value setting section C2 and the like.

Settings of the number of rotations, frequency and like in the control section C1 can be input to the control section C1 as parameters, and for example, the number of rotations, frequency, amplitude, the number of cuttings and the like can be set by being described in the machining program, and can be set with the frequency as an argument in the program block (one line in the program).

Further, in the present embodiment, the path of the cutting tool 130 in the backward movement of the n+1th cutting process reaches the position of the path of the cutting tool 130 at the time of switching from the forward movement to the backward movement in the nth cutting process. Then, the cutting part in the backward movement of the n+1th cutting process and the cutting part in the forward movement of the nth cutting process are theoretically brought into contact with each other at a "point". However, the path of the cutting tool 130 in the backward movement of the n+1th cutting process may exceed the position of the path of the cutting tool 130 at the time of switching from the forward movement to the backward movement in the nth cutting.

In other words, the control section C1 may control the cutting tool so that the cutting part in the backward movement of the n+1th cutting process and the cutting part in the forward movement of the nth cutting process overlap and include the state of contact.

In short, it is only needed that the cutting part in the nth cutting process is partially included in the cutting part in the n+1th cutting process.

The amplitude can be set with, for example, the ratio of the amplitude to the actual cutting amount of the cutting tool for the workpiece, (which is referred to as amplitude cut ratio). In the present embodiment, the amplitude and the cutting amount are set to be the same value. However, the amplitude may be set to be larger than the cutting amount.

For example, by setting the amplitude cut ratio to be larger than 1, the amplitude is set to be larger than the cutting amount, and the path of the cutting tool 130 in the backward movement of the n+1th cutting process can exceed the position of the path of the cutting tool 130 at the time of switching from the forward movement to the backward movement in the nth cutting process.

However, since the cutting amount decreases for each cutting process in one threading, the amplitude of the reciprocal vibration becomes smaller as the number of cuttings processes increases. The amount, by which the path of the cutting tool 130 in the backward movement of the n+1th cutting process exceeds the position of the path of the cutting tool 130 at the time of switching from the forward movement to the backward movement in the nth cutting process, gradually decreases.

Therefore, the amount, by which the path of the cutting tool 130 in the backward movement of the n+1th cutting process exceeds the position of the path of the cutting tool 130 at the time of switching from the forward movement to the backward movement in the nth cutting process, can be set as a guaranteed amplitude value in advance.

Therefore, with the amplitude set by the amplitude cut ratio, if the path of the cutting tool 130 in the backward movement exceeds the position of the path of the cutting tool 130 at the time of switching from the forward movement to the backward movement in the nth cutting process by only smaller amount than the guaranteed amplitude value, the amplitude can be the value obtained by adding the guaranteed amplitude value to the cutting amount.

The amplitude cut ratio and the guaranteed amplitude value can be input as parameters in the control section C1 in the same manner as the number of rotations and, for example, can be set by being described in the machining program, and can be set as an argument in the program block (one line of the program).

For example, as described above, in a case where the control section C1 is constituted so that, in the machining program, the start of the threading (start of vibration), in which the cutting tool 130 is relatively and reciprocally vibrated with respect to the workpiece W in the direction intersecting with the feed direction to perform multiple times of cutting process in a spiral form, is commanded by the command of GAAA P3, in the command of GAAA P3, the frequency N can be set as a value following D (argument D) in the control section C1, the amplitude cut ratio can be set as a value following Q (argument Q) in the control section C1, and the guaranteed amplitude value can be set as a value following U (argument U) in the control section C1.

The frequency N can also be set as the number of rotations of the spindle 110 per vibration.

For example, the number of rotations of the spindle 110 per vibration can be set in the control section C1 as a value following E (argument E).

When setting the amplitude cut ratio "1.2", "Q1.2" is described following G ΔΔΔ in the machining program, when setting the guaranteed amplitude value "0.02 mm", "U0.02" is described following G ΔΔΔ in the machining program, and when setting the frequency "1", "D1" is described following G ΔΔΔ in the machining program. In this way, the frequency N, the amplitude cut ratio, and the guaranteed amplitude value can be set in the control section C1.

In addition, setting as to how many times of cutting process to vibrate in one threading, setting as to how many times of cutting process to start vibration and the like can be input and set in the same manner as the number of rotations, the frequency, the amplitude cut ratio, the guaranteed amplitude value and the like of the spindle 110 described above.

For example, setting as to how many times of cutting process to vibrate can be set as a value following K (argument K) in the control section C1.

When setting the argument K, it is desirable to set the diameter of the workpiece W in the control section C1.

The diameter of the workpiece W can be set, for example, as a value following X (argument X) in the control section C1.

With the machine tool 100 and the control device C of the machine tool 100, which are obtained in this way in the first embodiment of the present invention, since they include the control section C1 as the vibration setting means that sets the vibration pattern in each of the cutting processes with reciprocal vibration so that the cutting part in the nth cutting process is partially included in the cutting part in the n+1th cutting process, when threading the workpiece W, chips are divided at the overlapping part. Therefore, it is possible to prevent the long connected chips from winding around the workpiece W or the cutting tool 130 and from damaging the machined surface of the workpiece W.

Further, if the frequency of the reciprocal vibration is constant, the phase of the reciprocal vibration in the n+1th cutting process is opposite to the phase of the reciprocal vibration in the nth cutting process, and the control section C1 controls the cutting tool 130 so that the path of the cutting tool 130 in the backward movement of the n+1th cutting process reaches the position of the path of the cutting tool 130 at the time of switching from the forward movement to the backward movement of the nth cutting process, threading can be performed with efficiently dividing chips.

Second Embodiment

The configuration of the second embodiment, which is different from that of the first embodiment, will be described below, and the description of common contents will be omitted.

Figure 7:
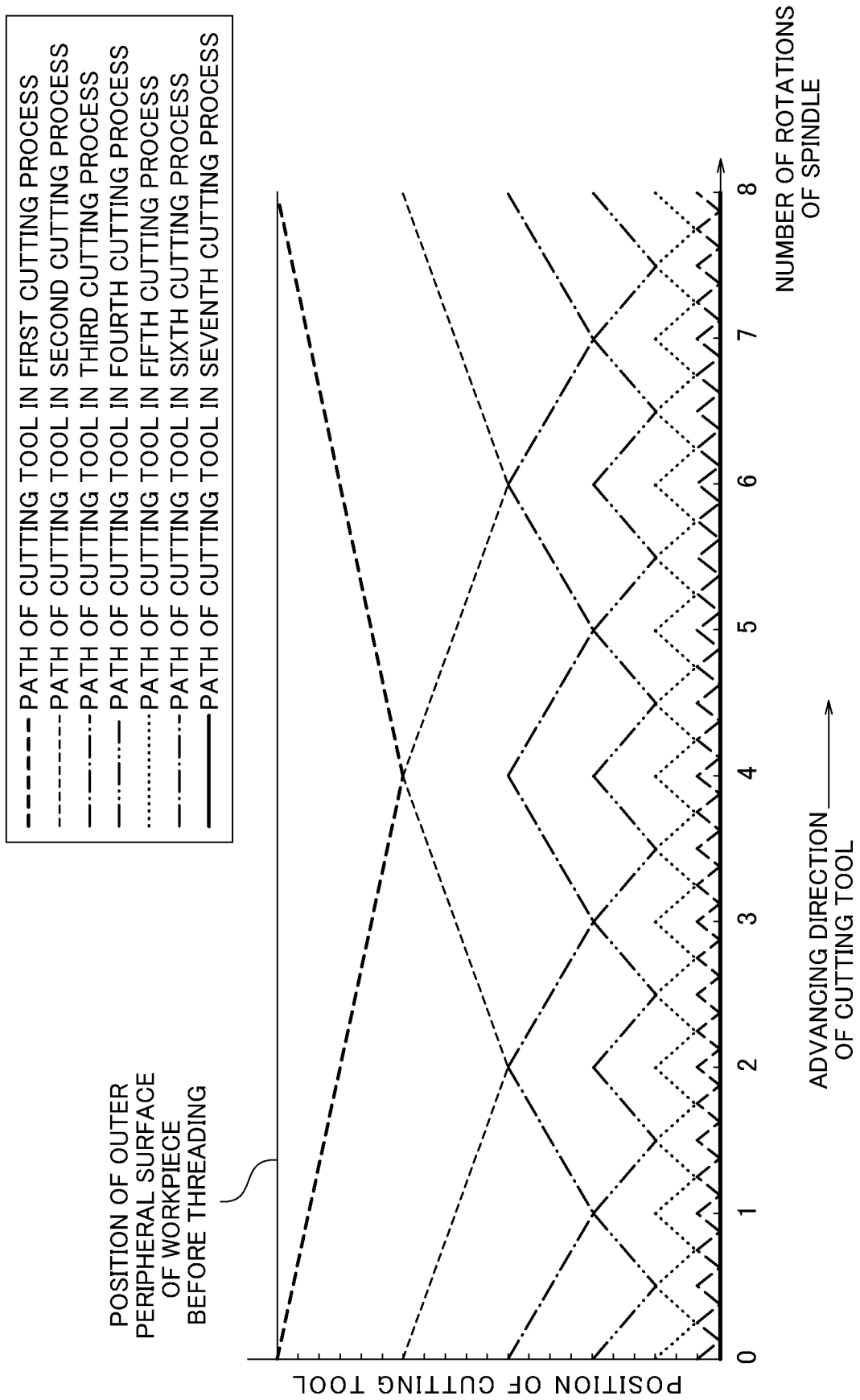
FIG. 7 is a development diagram schematically illustrating positions of the cutting tool with respect to the workpiece in the second embodiment of the present invention.

As shown in FIG. 7, in the second embodiment, the frequency of the reciprocal vibration by the vibration means is changed in the first to sixth cutting processes.

As an example, in the first cutting process, the cutting tool 130 vibrates once for every eight rotations of the spindle, and in the second cutting process, the cutting tool 130 vibrates once for every four rotations of the spindle, and in the third cutting process, the cutting tool 130 vibrates once for every two rotations of the spindle, and in the fourth cutting process, the cutting tool 130 vibrates once for one rotation of the spindle. Thus, the frequency of the reciprocal vibration is controlled to increase as the number of the cutting process increases.

As a result, the frequency gradually increases as the number of cutting processes increases, and the unevenness of the bottom surface of the screw of the workpiece W due to the threading becomes finer.

As in the first embodiment, the amplitude of the reciprocal vibration in the cutting process is set according to the cutting amount, and is controlled so as to decrease as the number of cutting processes increases.

However, it is also possible to set the ratio of the amplitude to the cutting amount, set the amount of increase of the amplitude relative to the cutting amount, or set a value according to the ratio and the amount of increase.

In the case of the second embodiment, in any of the cutting processes, the cutting tool 130 is reciprocated so that the cutting process starts from the start position of the forward movement of the reciprocal vibration and, in the backward movement of the reciprocal vibration of the cutting tool 130, the tip of the cutting tool 130 reaches the position of the path of the cutting tool 130 in the previous cutting process. Therefore, the machining start point is set at a position closer to the center of the workpiece W than the previous machining start point.

In the machine tool 100 and the control device C of the machine tool 100, which are obtained in this way in the second embodiment of the present invention, the frequency of the reciprocal vibration in the n+1th cutting process is set to be higher than the frequency of the reciprocal vibration in the nth cutting process. Further, the control section C1 makes the path of the cutting tool 130 in the backward movement of the n+1th cutting process reach the position of the path of the cutting tool 130 at the time of switching from the forward movement to the backward movement in the nth cutting process at a rate of once for multiple vibrations in the n+1th cutting process. In this way, the threading can be performed with efficiently dividing chips, and it is also possible to gradually adjust the bottom surface of the screw as the number of cutting processes increases.

REFERENCE SIGNS LIST

100 machine tool
110 spindle
110A spindle headstock
120 chuck
130 cutting tool
130A cutting tool post
150 X-axis direction feeding mechanism
151 base
152 X-axis direction guide rail
153 X-axis direction feeding table
154 X-axis direction guide
155 linear servomotor
155*a* mover
155*b* stator
160 Z-axis direction feeding mechanism
161 base
162 Z-axis direction guide rail
163 Z-axis direction feeding table
164 Z-axis direction guide
165 linear servomotor
165*a* mover
165*b* stator
C control device
C1 control section
C2 numerical value setting section
h distance from the outer peripheral surface of the workpiece before the threading
I initial point
S machining start point
W workpiece

The invention claimed is:
1. A machine tool comprising:
workpiece holding means for holding a workpiece;
a tool post to hold a cutting tool for cutting the workpiece;
feeding means for feeding the cutting tool in a predetermined feed direction toward the workpiece by a relative movement of the workpiece holding means and the tool post;
vibration means for relatively and reciprocally vibrating at least one of the workpiece holding means and the tool post in a radial direction of the workpiece;
rotating means for relatively rotating at least one of the workpiece and the cutting tool; and
control means for controlling operations of the feeding means, the vibration means and the rotating means, and
in threading the workpiece to form a threaded portion on the workpiece by performing multiple times of cutting processes that are performed by relatively moving the at least one of the workpiece and the cutting tool in the feed direction along the same cutting path in a predetermined spiral form while relatively rotating the at least one of the workpiece and the cutting tool and by cutting the workpiece with the cutting tool, in each of the cutting processes, the cutting tool being brought closer to a machining start point, which is set at a distance away from an end face of the workpiece, the distance being determined by multiplying a pitch of the threaded portion by a predetermined number of times, from a predetermined initial point, which is diagonally above the end face of the workpiece and at which the workpiece and the cutting tool are separated from each other, and the cutting tool being brought into contact with the workpiece by feeding the cutting tool from the machining start point in the feed direction to start the cutting process with the contact, wherein
in each of the cutting process, phase in reciprocal vibration of the cutting tool when the cutting tool reaches the machining start point synchronizes with rotation phase of the relative rotation to form a threaded portion on the workpiece, wherein
the control means stops reciprocal vibration of the cutting tool when the cutting tool moves from the initial point to the machining start point in each of the cutting processes, and wherein
the control means performs the synchronization before the cutting tool reaches the machining start point in each of the cutting processes.

2. A control device for a machine tool provided with:
workpiece holding means for holding a workpiece;
a tool post to hold a cutting tool for cutting the workpiece;
feeding means for feeding the cutting tool in a predetermined feed direction toward the workpiece by a relative movement of the workpiece holding means and the tool post;
vibration means for relatively and reciprocally vibrating at least one of the workpiece holding means and the tool post in a radial direction of the workpiece; and
rotating means for relatively rotating at least one of the workpiece and the cutting tool,
the control device controlling operations of the feeding means, the vibration means and the rotating means,
in threading the workpiece to form a threaded portion on the workpiece by performing multiple times of cutting processes that are performed by relatively moving the at least one of the workpiece and the cutting tool in the feed direction along the same cutting path in a predetermined spiral form while relatively rotating the at least one of the workpiece and the cutting tool and by cutting the workpiece with the cutting tool, in each of the cutting processes, the cutting tool being brought closer to a machining start point, which is set at a distance away from an end face of the workpiece, the distance being determined by multiplying a pitch of the threaded portion by a predetermined number of times, from a predetermined initial point, which is diagonally above the end face of the workpiece and at which the workpiece and the cutting tool are separated from each other, and the cutting tool being brought into contact with the workpiece by feeding the cutting tool from the machining start point in the feed direction to start the cutting process with the contact, wherein in each of the cutting process, phase in reciprocal vibration of the cutting tool when the cutting tool reaches the machining start point synchronizes with rotation phase of the relative rotation to form a threaded portion on the workpiece, wherein the control means stops reciprocal vibration of the cutting tool when the cutting tool moves from the initial point to the machining start point in each of the cutting processes, and wherein the control means performs the synchronization before the cutting tool reaches the machining start point in each of the cutting processes.

\* \* \* \* \*